United States Patent [19]

Akiba et al.

[11] Patent Number: 4,589,256
[45] Date of Patent: May 20, 1986

[54] STEAM TURBINE PLANT

[75] Inventors: Masashi Akiba; Ryuji Minagawa; Sumio Mori, all of Yokohama, Japan

[73] Assignee: Tokyo Shibaura Denki Kabushiki Kaisha, Kawasaki, Japan

[21] Appl. No.: 543,829

[22] Filed: Oct. 20, 1983

[30] Foreign Application Priority Data

Oct. 20, 1982 [JP] Japan .................................. 57-184347

[51] Int. Cl.<sup>4</sup> ............................................. F01K 13/02
[52] U.S. Cl. ......................................... 60/660; 60/657
[58] Field of Search ................. 60/646, 657, 660, 662; 415/175, 176

[56] References Cited

U.S. PATENT DOCUMENTS

| | | | |
|---|---|---|---|
| 2,451,261 | 10/1948 | Warren et al. | 60/657 |
| 3,062,553 | 11/1962 | Juzi | 60/646 X |
| 3,935,710 | 2/1976 | Dickinson | 60/657 |
| 4,425,077 | 1/1984 | Martin | 415/176 X |

Primary Examiner—Stephen F. Husar

Attorney, Agent, or Firm—Oblon, Fisher, Spivak, McClelland & Maier

[57] ABSTRACT

A steam turbine plant includes a steam turbine with a shrink-fit type rotor and a gland seal steam supply apparatus that supplies gland seal steam into the gland portion of the steam turbine. The gland seal steam supply apparatus has an evaporator that uses main steam or turbine extraction steam as a heating medium. A steam supply apparatus supplies steam generated within the evaporator into the portions of the turbine which are in danger of developing stress corrosion cracks. The steam supply apparatus includes a pressure reducing apparatus for supplying steam at a reduced pressure into the portions which are in danger of developing stress corrosion cracks. A steam detecting apparatus detects the steam conditions in the rotor as a function of the turbine load and a control apparatus receives the detected signal from the steam detecting apparatus for the purpose of controlling either the pressure of steam generated within the evaporator or the operation of the pressure reducing apparatus.

12 Claims, 12 Drawing Figures

STEAM TURBINE PLANT

BACKGROUND OF THE INVENTION

1. Field of the Invention

This invention relates to a steam turbine for use in nuclear power plants, geothermal power plants and so forth, and more particularly to steam turbine designed so as to prevent stress corrosion cracking of shrink-fit type turbine rotors.

2. Description of the Prior Art

In general, the rotors of steam turbines for use in nuclear power plants, geothermal power plants and the like may be manufactured by processes as follows: machining after monobloc forging from material such as alloy steel, machining after monobloc welding of disc-shaped materials to the rotor shaft, and fitting wheel discs which have previously been machined and provided with implanted blades, to the rotor shaft so as to form a monobloc in shrink-fit manner. Of these types, the shrink-fit type turbine rotor has been used for many years because larger-size turbine rotors can be manufactured from relatively small forging materials, since the rotor shaft and respective disc plates are initially separate.

Figure 1:
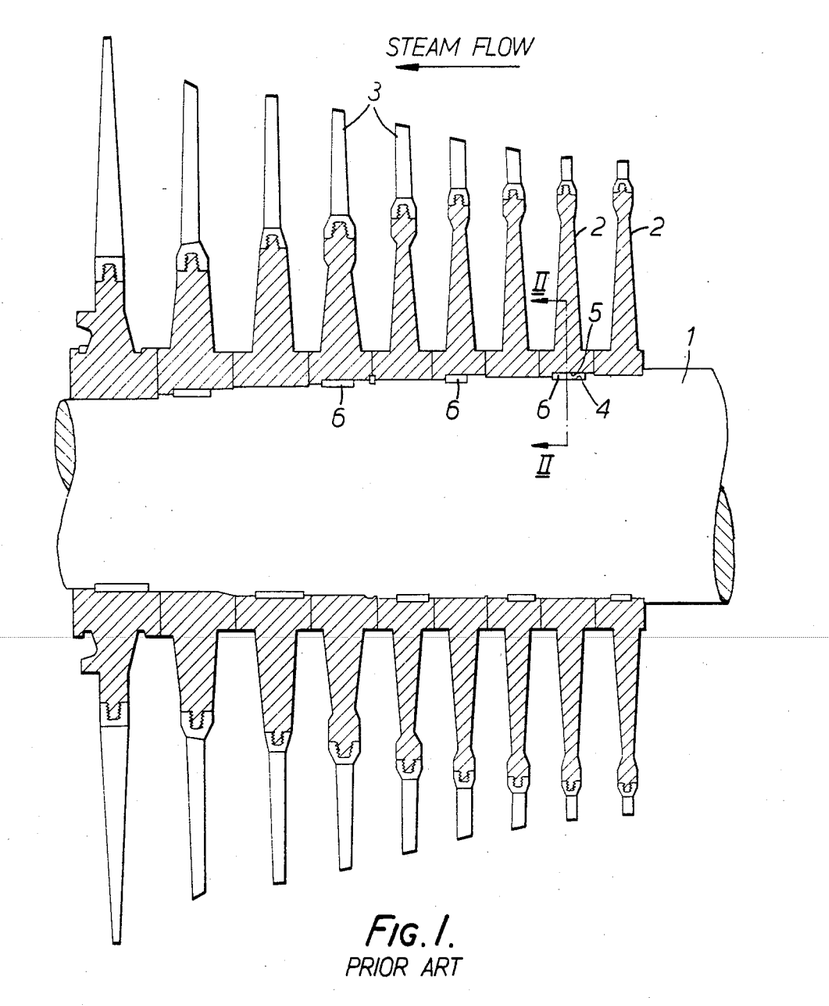
FIG. 1 is a diagram illustrating a known shrink-fit type turbine rotor of a steam turbine.

FIG. 1 shows one example of the conventional shrink-fit type rotor. In FIG. 1, the inner diameters of respective wheel discs 2 are manufactured to be smaller in size than corresponding outer diameters of a rotor shaft 1 by an amount known as a shrinkage allowance at room temperatures. In order to shrink fit the wheel discs 2 onto the shaft 1, the wheel discs 2 are first heated, while not raising the temperature of the rotor shaft 1, so that the wheel disks 2 thermally expand. After the inner diameters of the wheel discs 2 are expanded to such an extent as to be larger than the corresponding outer diameters of the shaft 1, they are positioned on the shaft 1 and are disposed thereon at specified positions. Thereafter the wheel discs 2 are cooled down and shrink fitted onto the shaft 1 by virtue of thermal shrinkage so that a turbine rotor results. On the outer circumferences of the respective wheel discs 2 which are thus rigidly fixed, there are implanted plural blades 3 so as to constitute turbine blades.

Figure 2:
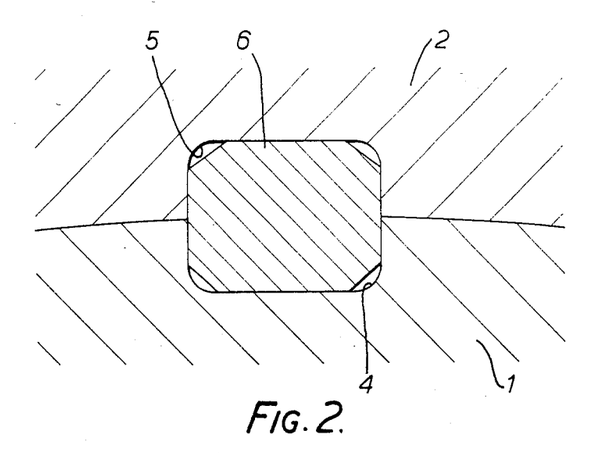
FIG. 2 shows a cross-sectional view along the line II—II of FIG. 1.

The respective connecting faces between the rotor shaft 1 and the wheel discs 2 are respectively provided with key ways 4 and 5 within which bore keys 6 are disposed. The bore keys 6 serve to prevent the respective wheel discs 2 from relatively rotating with respect to the shaft 1, even when the shrink-fit is unintentionally loosened under abnormal operating conditions.

However, in a steam turbine plant using such a shrink-fit type turbine rotor, the turbine rotor is in danger of developing so-called stress corrosion cracks with the result that the turbine rotor deteriorates in reliability and the life span thereof is shortened. One aspect of the development mechanism of stress corrosion cracking is a phenomenon such that in the environment of water or steam containing oxygen, metal surface oxide films are locally destroyed and selectively restructured due to the tensile stress effected on the material thereof, resulting in development of the cracks. Accordingly, the stress corrosion cracks develop upon concurrent occurrence of three factors as follows: that the material has sensitivity with respect to cracking, that high stress of a value more than a specified limit value is effected, and that the material is situated in an environment in which the material undergoes both development and destruction of local oxide films.

The sensitivity of the material to stress corrosion cracking is also related to material strength and, in general, the higher the tensile strength of the material the higher its sensitivity to the cracking. The wheel discs 2 of the shrink-fit type turbine rotor inevitably require, due to the higher stress effected thereupon, the use of higher tensile-strength alloy steels, and it is not forseeable that materials with no sensitivity to such cracking could be developed in the future.

When considering the stress effected upon the wheel discs 2 of the shrink-fit type turbine rotor, it is recognized that there are developed both the shrink-fit stress derived from the intial stage shrink-fit and the centrifugal stress derived from the fact that centrifugal force acts on both the wheel discs 2 and the blades 3 during rotation. The values of such stress become higher at the radially inner portions of the wheel discs 2. In particular, on the key ways 5 around the disc bore keys 6, there are developed stress concentrations derived as a function of the configurations thereof, and the values of such stresses frequently exceed the limit value beyond which stress corrosion cracks are initiated.

Moreover, in terms of environment, the qualitative characteristiscs of steam in power plant facilities are determined on the basis of the overall specifications of such facilities as a steam generator (boiler, nuclear reactor and the like), a condenser and a feed water facility, so that it is difficult to carry out a sophisticated water quality control program concentrated only upon concern for the stress corrosion cracking of the wheel discs 2. Particularly in a BWR (Boiling Water Reactor) type nuclear power plant or a geothermal power plant, it is impossible to prevent oxygen (impurities) generated within the nuclear reactor from penetrating into the steam turbine together with steam.

In the vicinity of the key ways 5 of the wheel discs 2 of the above-described conventional shrink-fit type rotor, there is a danger of development of stress corrosion cracks because the three factors mentioned above are present. If the stress corrosion cracks develop on the wheel discs 2 and are not discovered early enough to be nipped in the bud by means of test procedures such as NDI (Non-Destructive Investigation), this can lead to the destruction of the wheel discs 2, resulting in the danger of serious accidents.

As a countermeasure with respect to the environment, which is one of the factors affecting development of such stress corrosion cracking, attempts have been made to maintain the environment such that clean steam with less impurities is supplied from outside the steam turbine to the wheel discs 2 which are in danger of developing the stress corrosion cracks so as to cause the wheel discs and the vicinity thereof to be less susceptible to such stress corrosion cracking. However, to achieve this it is necessary to independently install a steam supply source that generates clean dry steam.

Figure 3:
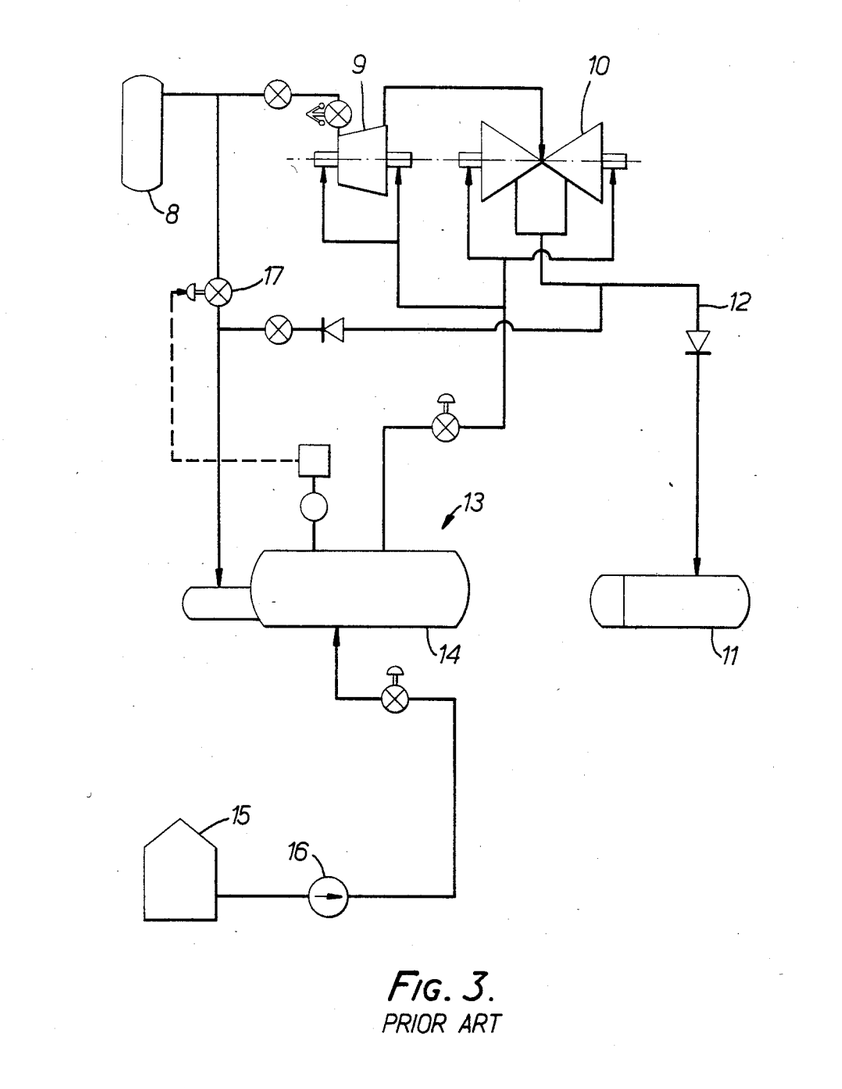
FIG. 3 is a schematic diagram illustrating a conventional steam turbine plant.

A nuclear power plant which incorporates a steam turbine that uses the conventional shrink-fit type turbine rotor is constituted as shown in FIG. 3, wherein steam from a nuclear reactor 8 is led through a high pressure steam turbine 9 via a main steam line into a low pressure steam turbine 10 so as to become spent. The spent steam is then led to a condenser (not shown).

Condensate from the condenser is, in turn, boosted in pressure by means of a feed water pump (not shown) and fed through a filter into a feed-water heater 11.

Within the feedwater heater, the condensate is heated by turbine extraction steam supplied from the low pressure turbine 10 or the high pressure turbine 9 through an extraction steam pipe 12. The thus heated condensate is returned by means of a feed-water pump (not shown) into the nuclear reactor 8.

In the conventional nuclear power plant, there is provided a gland seal steam supply apparatus 13 that supplies gland seal steam into the high pressure turbine 9 and the low pressure turbine 10. The gland seal steam supply apparatus 13 includes an evaporator 14 into which clean condensate with low impurities from a condensate storage tank 15 is supplied through a feedwater pump 16. The condensate supplied into the evaporator 14 is heated either by main steam which is obtained from the nuclear reactor 8 and reduced in pressure through a main steam control valve 17 or by turbine extraction steam from the low pressure turbine 10.

The steam pressure required for gland sealing of the turbines 9 and 10 is relatively low, for instance, as low as 0.28 kg/cm$^2$ so that the pressure of the steam generated within the evaporator 14 can be as low as approximately 3 to 4 kg/cm$^2$ at most, and the steam can be saturated steam with a wetness of approximately 1%. The pressure of the steam generated within the evaporator 14 is so low that the pressure of the condensate heating steam (medium) can also be low. Thus, the condensate heating steam can be extraction steam which is extracted from an intermediate stage of the low pressure turbine 10.

Hitherto, however, the gland seal steam supply apparatus 13 has served only to supply the low pressure steam generated within the evaporator 14 into the gland seal portions of the high pressure turbine 9 and the low pressure turbine 10 for gland sealing, and any other use of such steam has never been considered.

SUMMARY OF THE INVENTION

One object of this invention is to provide a new and improved steam turbine plant that can enhance the reliability of the turbine rotor so as to significantly improve the life span thereof compared with the conventional steam turbine plant. This is achieved by eliminating crucial factors responsible for stress corrosion cracking by use of clean steam, with less impurities, from the evaporator of the gland seal steam supply apparatus.

Another object of this invention is to provide a steam turbine plant capable of eliminating the need to install a new and independent steam generator, by use of an evaporator which is incorporated within the gland seal steam supply apparatus of a steam turbine generally used for nuclear power plants or geothermal power plants. The steam supply evaporator supplies steam so as to prevent development of stress corrosion cracking.

Another object of this invention is to provide a steam turbine plant with enhanced reliability in preventing stress corrosion cracking of the wheel disc portions of a shrink-fit type turbine rotor. To achieve this, a control apparatus for preventing stress corrosion cracking is installed such that the portions (the wheel disc portions of the turbine rotor) which are in danger of developing stress corrosion cracking are continuously situated in an environment that impedes development of stress corrosion cracking not only during operation of the steam turbine, but also prior to start-up thereof.

Further, another object of this invention is to provide a steam turbine plant such that the shrink-fit type turbine rotor portion thereof is always situated in an environment that impedes development of stress corrosion cracking by virtue of controlling the pressure of steam for preventing stress corrosion cracking in conformity with the operation load of the steam turbine.

Briefly, in accordance with one aspect of this invention, there is provided a steam turbine plant including a steam turbine with a shrink-fit type turbine rotor, and a gland seal steam supply appratus that supplies gland seal steam into the gland portion of the steam turbine. The gland seal steam supply apparatus has an evaporator that uses main steam or turbine extraction steam as a heating medium. A steam supply apparatus supplies steam generated within the evaporator into the portions which are in danger of developing stress corrosion cracking.

The steam turbine plant also includes a steam supply apparatus provided with a pressure reducing apparatus for supplying steam generated within the evaporator into the portions which are in danger of developing stress corrosion cracking, a steam detecting apparatus that detects the steam conditions in the shrink-fit type rotor portion as a function of turbine load detection, and a control apparatus that receives the detecting signal from the steam detecting apparatus for the purpose of controlling either the pressure of steam generated within the evaporator or the operations of the pressure reducing apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

In the drawings, like reference numerals and letters designate identical or corresponding parts throughout the several views.

Figure 4:
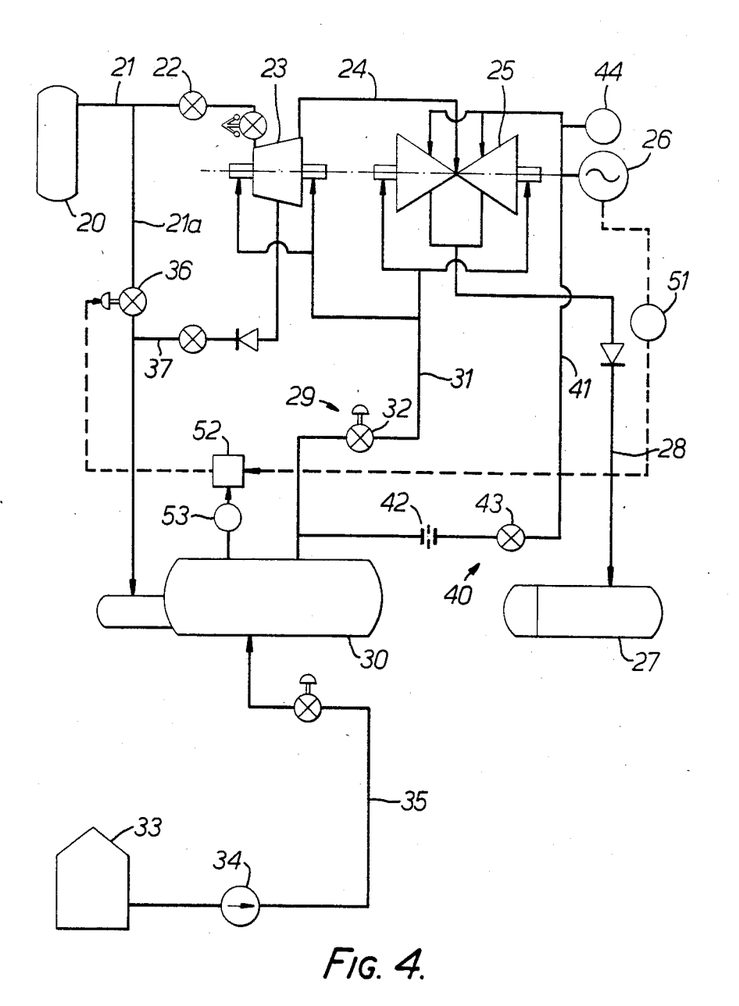
FIG. 4 is a schematic diagram illustrating one embodiment of a steam turbine plant according to the present invention to be installed in a nuclear power plant.

Referring now to FIG. 4, showing a diagram illustrating a steam turbine plant according to the present invention to be adapted to a nuclear power plant, reference numeral 20 represents a nuclear reactor forming a BWR (Boiling Water Reactor) type power plant. Steam generated within the nuclear reactor 20 is supplied through a main steam line 21 via a main steam valve 22 and a control valve (unnumbered) into a high pressure steam turbine 23. From turbine 23, the steam is, in turn, supplied through a communicating pipe 24 into a low pressure steam turbine (including an intermediate pressure steam turbine) 25, to be spent therein so as to drive an electric generator 26. The steam spent within steam turbines 23 and 25 is fed into a condenser (not shown) so as to be condensed into condensate. The condensate is boosted in pressure within a feed-water pump (not shown) and purified within a filter apparatus (not shown). After purification, the steam is fed into a feed water heater 27. A part of the purified condensate is circulated, in order to maintain the steam balance, into a condensate storage tank 33 that will be described later. An extraction steam pipe 28 from the low pressure turbine 25 is connected via a check valve to the feed water heater 27. The condensate is heated by the turbine extraction steam which is fed through the extraction steam pipe 28 and an extraction steam pipe (not shown) from the high pressure turbine 23. The thus heated condensate is then circulated back into the nuclear reactor 20 by virtue of pumping function of a feed-water pump or the like (not shown).

On the other hand, gland seal steam to perform gland sealing with respect to the steam turbines 23 and 25 is supplied from a gland seal steam supply apparatus 29. The gland seal steam supply apparatus 29 is provided with an evaporator 30 from which the gland seal steam is supplied through a gland seal steam line 31 into the respective gland portions of both the high and low pressure turbines 23 and 25. At a mid-portion of the steam line 31, there is installed a pressure reducing valve 32 that reduces the pressure of gland seal steam.

The condensate stored within the condensate storage tank 33 is supplied through an auxiliary feed-water pipe 35 by means of a feed-water pump 34 into the evaporator 30. The condensate storage tank 33 stores clean condensate with reduced impurities as described above.

The condensate supplied into the evaporator 30 is heated either by main steam from the nuclear reactor 20 or by the turbine extraction steam from the high pressure turbine 23. For this purpose, the evaporator 30 is connected with a steam pipe 21a branched from the main steam line 21, and the steam pipe 21a is provided with a main steam pressure reducing valve 36, which is connected, on the downsteam side thereof, with a turbine extraction steam pipe 37 having a valve and a check valve (unnumbered).

The evaporator 30 also serves as an evaporator of a steam supply apparatus 40 for use in preventing stress corrosion cracking. From the steam supply apparatus 40, a steam line 41 is extended so as to be connected to the low pressure turbine 25. In a mid-portion of the steam line 41, there are provided a pressure reducing orifice 42 and a valve 43, both forming parts of a pressure reducing apparatus. The opening status of the valve 43 is detected by a valve opening (i.e. steam) detecting apparatus 44, from which a detecting signal is produced so as to indicate a start-up condition for the steam turbines 23 and 25.

Figure 5:
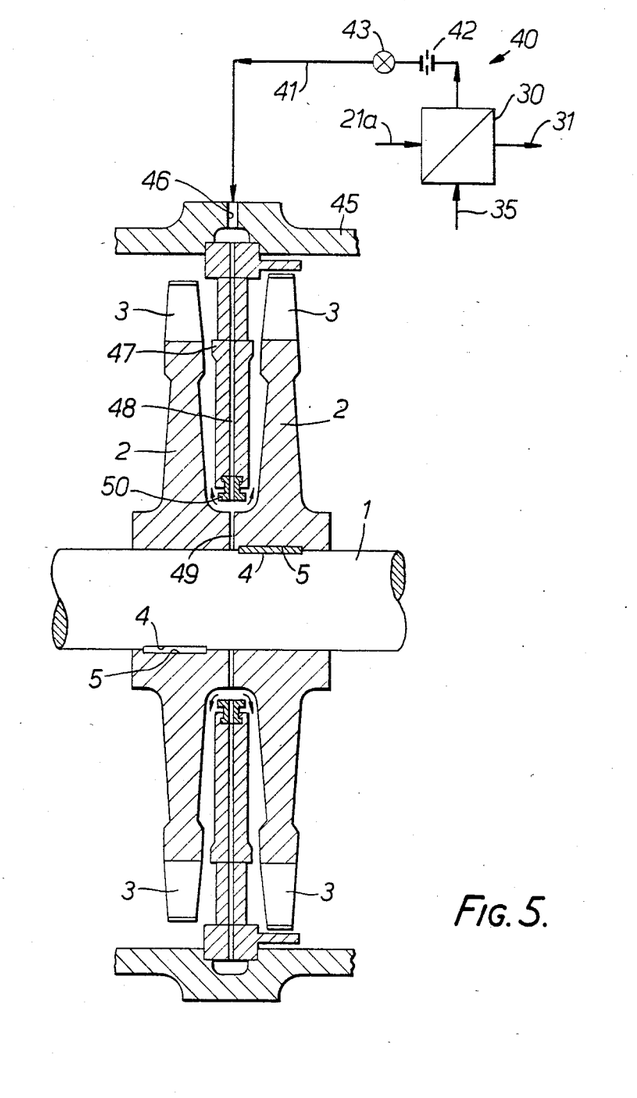
FIG. 5 is a schematic diagram illustrating a steam supply apparatus for supplying clean steam with no impurities into the portions (turbine rotor wheel disc portions) which are in danger of developing stress corrosion cracking.

The steam line 41 connected to the low pressure steam turbine 25 is connected, as shown in FIG. 5, to the base of a nozzle diaphragm 47, through a penetrating bore 46 of the turbine casing 45. Further, the nozzle diaphragm 47 is provided with a penetrating bore 48 in the radial direction of a turbine casing 45. Through the penetrating bore 48, clean dry steam with no impurities is supplied to the wheel discs 2 of the turbine rotor which are in danger of developing stress corrosion cracks, and more particularly to the base between the respective wheel discs 2, and into the key ways 4 and 5 through a gap 49 between the respective wheel discs 2. The gap 49 between the adjacent wheel discs 2 and 2 is sufficiently large to prevent the adverse effects which would be caused by the discs contacting one another due to the thermal expansions thereof.

In general, most of high pressure main steam from the nuclear reactor 20 passes through the turbine blades (moving blades) which are not in danger of developing stress corrosion cracks, so as to be spent. However, the remaining approximately 1% of the steam can leak past a labyrinth packing 50 at tip of the nozzle diaphragm 47. This leakage steam, which contains dissolved oxygen, contributes to the development of stress corrosion cracks on the wheel discs 2 of the turbine rotor. According to the present invention, such an adverse influence caused by the steam leakage with impurities is prevented by covering the portions which are in danger of developing stress corrosion cracking with clean dry steam with less impurities from the nozzle diaphragm 47.

The electric generator 26 of the steam turbine is provided, as shown in FIG. 4, with an output detector 51 that functions as a steam detector to detect the steam conditions in the rotor portions of the shrink-fit type turbine rotor 1. A detecting signal from the output detector 51 is fed into a pressure reducing valve control apparatus 52. The pressure reducing valve control apparatus 52 receives the turbine output detecting signal (turbine load) from the output detecting apparatus 51 so as to control the opening of the main stream pressure reducing valve 36 so that the pressure of main steam to be supplied into the evaporator 30 is controlled. This pressure control causes the pressure of the steam generated within the evaporator 30 to be controlled. The pressure of the generated steam is detected by a pressure detector 53, and a detected signal from the detector 53 is also fed into the control apparatus 52.

Next, the operations to prevent the development of stress corrosion cracking according to the present invention will be described.

The clean condensate with reduced impurities is supplied from the condensate storage tank 33 into the evaporator 30 of the steam supply apparatus 40 which functions both to prevent stress corrosion cracking and to serve the gland seal steam supply apparatus 29. The condensate supplied into the evaporator 30 is heated therein either by the main steam from the nuclear reactor 20 or by the turbine extraction steam so as to be evaporated. In this case, prior to start-up of the steam turbines 23 and 25, namely before the turbine extraction steam reaches a sufficiently high pressure, the evaporator 30 receives the main steam from the nuclear reactor 20. The main steam is so controlled by means of the main steam pressure reducing value 36 that the pressure of the steam generated within the evaporator 30 reaches an appropriate pressure value.

Figure 6:
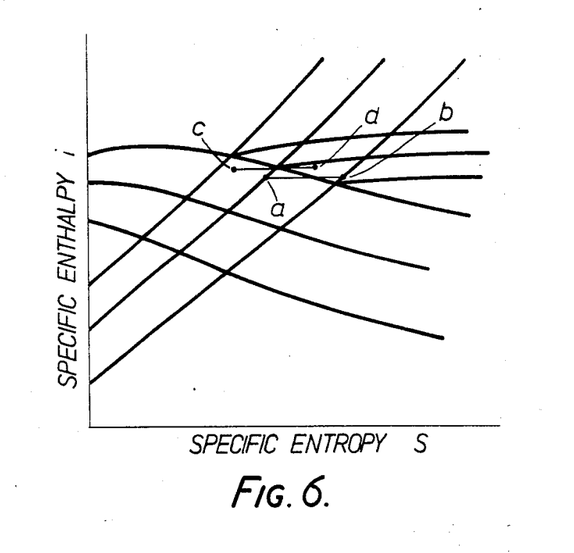
FIG. 6 is a graph illustrating the steam status before and after the steam pressure reducing valve within a pressure reducing apparatus.

After the clean steam with reduced impurities generated within the evaporator 30 is sufficiently reduced in pressure by the pressure reducing valve 32, a portion of this clean steam is supplied through the gland seal steam line 31 into the respective gland portions of the steam turbines 23 and 25. In addition, another portion of the generated steam which has been reduced in pressure by the pressure reducing orifice 42 is supplied through the steam pipe 41 into the wheel disc portions 12 of the shrink-fit type turbine rotor. The steam generated within the evaporator 30 is a saturated steam of high pressure with high wetness; however, this saturated steam is converted into dry steam by virtue of a rapid pressure reduction performed by the pressure reducing orifice 42 before entering bore 46. For example, as shown in FIG. 6, the quality of the generated steam within the evaporator 30 represented by the point a shifts, by virtue of the rapid pressure reduction through orifice 42, to the quality of the steam represented by the point b. This indicates that for instance, wet generated steam of 5 Kg/cm$^2$ in steam pressure with a wetness of 1% shifts to dry steam of 2 Kg/cm$^2$ in steam pressure.

Therefore, the clean generated steam from the evaporator 30 is rapidly reduced in pressure so as to become dry steam, which, in turn, is supplied into the wheel discs 2 (FIG. 5) of the shrink-fit type turbine rotor so that they may be continuously maintained in an environment that impedes the development of stress corrosion cracking. Further, since the condensate within the evaporator 30 is heated by the main steam from the nuclear reactor 20, even prior to start-up of the steam turbines 23 and 25, the wheel discs 2 of the turbine rotor may be continuously maintained in an environment that impedes the development of stress corrosion cracking.

When the steam turbines 23 and 25 start up and the turbine extraction steam reaches a sufficiently high pressure, the source of the condensate heating steam within the evaporator 30 is gradually changed from the main steam to the turbine extraction steam. In this case, since the pressure of the turbine extraction steam is sufficiently high, the pressure of the generated steam within the evaporator 30 becomes the same as in the case when heated by the main steam, so that the steam which is reduced in pressure by the pressure reducing orifice 42 is converted into dry steam. The points c and d in FIG. 6 respectively indicate the quality of the generated steam of the evaporator 30 before and after the pressure reducing orifice 42 when operating with a turbine load of 100%.

Figure 7:
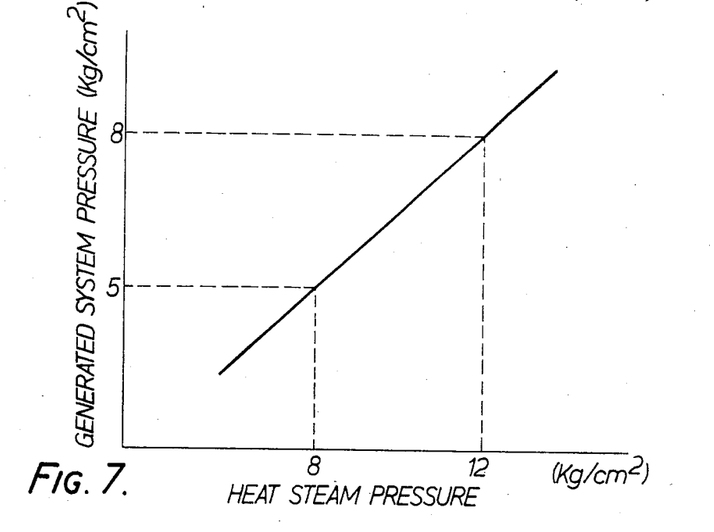
FIG. 7 is a graph illustrating the pressure relationship between heat steam and the generated steam within the evaporator.

FIG. 7 shows the pressure relationship between the heat steam to be supplied into the evaporator 30, such as main steam or turbine extraction steam, and the generated steam generated within the evaporator 30. With reference to FIG. 7, when operating with a turbine load of 100% and the pressure of turbine extraction steam, that is, the pressure of heat steam within the evaporator 30 at approximately 12 Kg/cm$^2$, the pressure of generated steam is approximately 8 Kg/cm$^2$. The steam quality of the generated steam within the evaporator 30 corresponds to the point c in FIG. 6, which represents wet steam with a wetness of 1%, however, such steam quality shifts, by virtue of the rapid pressure reduction in the orifice 42, to the point d so as to become dry steam. Therefore, the installation of the pressure reducing orifice 42 can supply dry steam into the wheel disc portions 2 of the turbine rotor.

The method of operating the steam turbine plant will now be described.

First, prior to the start-up of the steam turbines 23 and 25, the main steam from the nuclear reactor 20 heats the evaporator 30. The evaporator 30 generates steam, which, in turn, is detected by the pressure detector 53, and this detected signal is fed into the main steam pressure reducing valve control apparatus 52 so as to control the opening of the main steam pressure reducing valve 36. This opening control allows the generated steam pressure of the evaporator 30 to be adjusted to a specified pressure.

When the generated steam pressure of the evaporator 30 becomes sufficiently high and reaches a specified pressure, the valve 43 installed on the steam pipe 41 is opened, and the wet steam passing through pipe 41 from the evaporator 30 is rapidly reduced in pressure by means of the pressure reducing orifice 42 so as to become dry steam which, in turn, is supplied into the turbine rotor wheel disc portions of the low pressure steam turbine 25. When sufficient dry steam has been supplied into the turbine rotor wheel disc portions, this status can be detected by the steam pressure detector 44, which produces the detecting signal, thereby causing the start-up of the steam turbine. Therefore, the wheel disc portions of the shrink-fit type rotor of the steam turbine may be situated, even prior to the start-up thereof, in an environment that impedes the development of stress corrosion cracking.

Next, the operation will be described as to the period after the steam turbine has started up and before steam pressure within the turbine extraction pipe 37 becomes sufficiently high. In this case, the pressure of steam to be supplied into the wheel disc portion 2 of the shrink-fit type turbine rotor must be varied in accordance with the turbine load, so the turbine load signal (the detected signal) of the electric generator output detector 51 is fed into the main steam pressure reducing valve control apparatus 52 so as to adjust the opening of the main steam pressure reducing valve 36, thereby controlling the generated steam pressure of the evaporator 30.

Figure 8:
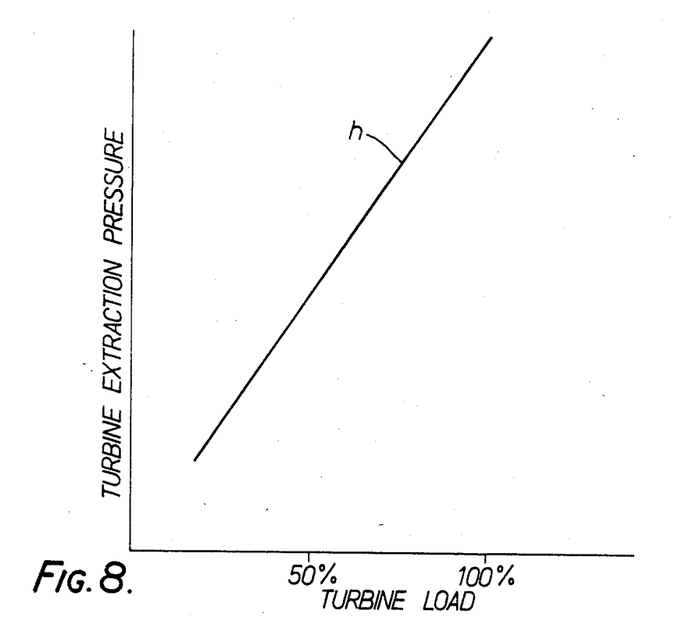
FIG. 8 is a graph illustrating the relationship between the turbine load of the steam turbine and the turbine extraction steam pressure.

Next, the operation will be described as to the period after the heat steam of the turbine extraction pipe 37 has reached a sufficiently high pressure. In this case, as shown in FIG. 8, there is a proportional relationship, represented by a straight line h, between the turbine load and the pressure in the turbine extraction pipe 37, and there also exists a pressure relationship between the heat steam and the generated steam of the evaporator 30 as shown in FIG. 7. Both of the diagrams illustrate that when heating the evaporator 30 by the turbine extraction steam, the generated steam pressure of the evaporator 30 is varied in accordance with the variation of the heat steam pressure, and when heating the evaporator 30 by the turbine extraction steam the pressure of steam to be supplied into the wheel disc portion 2 of the turbine rotor is automatically controlled.

As described above, not only during the operation of the steam turbine, but also even prior to the start-up thereof, clean steam with reduced impurities can be steadily supplied into the wheel disc portions of the shrink-fit type turbine rotor.

Figure 9:
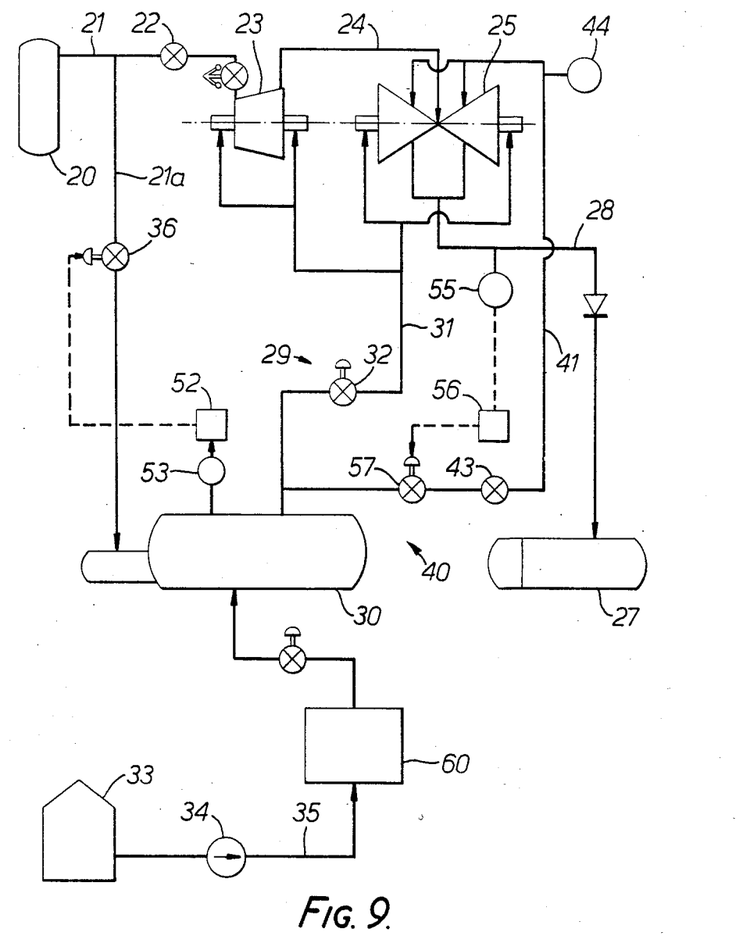
FIGS. 9 through 12 are respectively schematic diagrams illustrating other embodiments according to the present invention.

In the aforementioned embodiment according to the present invention, the description has been made with the pressure of the steam to be supplied into the wheel disc portions of the turbine rotor controlled by the detecting signal from the electric generator output detector. However, instead of this detecting signal, as shown in FIG. 9, a modification may also be obtained such that an extraction steam pressure detector 55 is installed on the turbine extraction steam pipe 28 from the low pressure turbine 25, and the detecting signal therefrom is fed into a steam pressure reducing valve control apparatus 56 so as to control the opening of a pressure reducing valve 57 which is installed in line 41 instead of the pressure reducing orifice 42. There is no problem even if the turbine extraction steam pressure is to be detected by the pressure detector 55, because this extraction steam pressure is, as shown in FIG. 8, varied in proportion to, and in concert with, the turbine load.

In the embodiment of FIG. 4, the generated steam pressure within the evaporator 30 is controlled by the opening adjustment of the main steam pressure reducing valve 36. However, there may also be obtained such a modification that instead of controlling the pressure of generated steam within the evaporator 30, a pressure control valve (pressure reducing valve) 57 installed on the steam pipe 41 is used so as to control the generated steam pressure.

Moreover, heating the condensate within the evaporator 30 may also be achieved only by use of the main steam from the nuclear reactor.

Further, in order to more effectively clean the condensate to be supplied into the evaporator 30, there may also be provided a water quality control apparatus 60 such as a purifier on make-up pipe 35 from the condensate storage tank 33 so as to eliminate impurities such as the dissolved oxygen.

Figure 10:
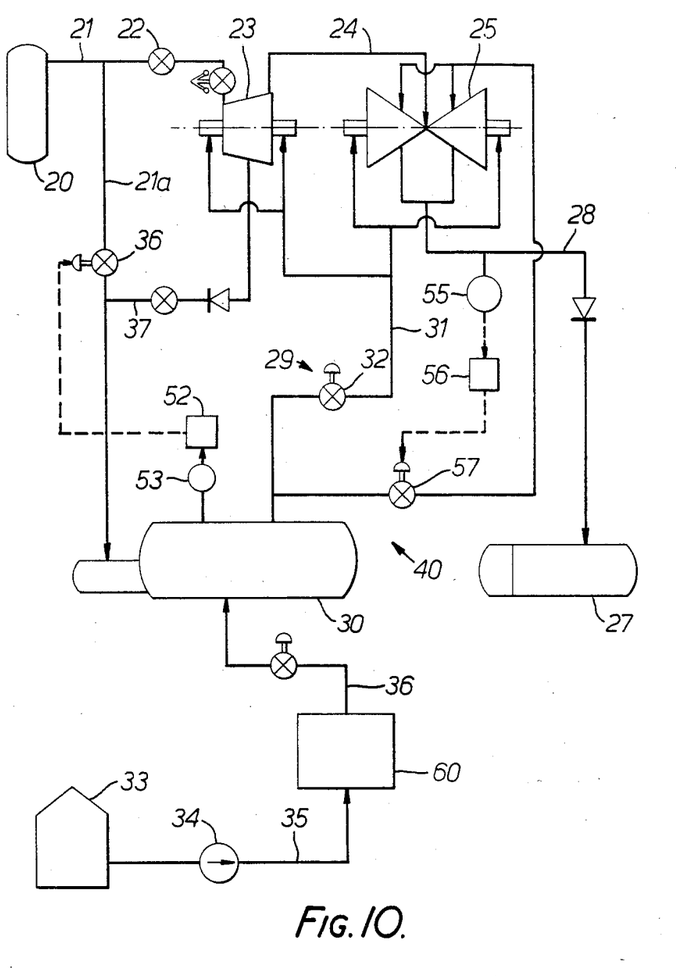

In the embodiment shown in FIG. 4, there are provided the valve 43 and the valve-opening detecting apparatus 44 on the steam supply pipe 41. However, as shown in FIG. 10, when a pressure reducing valve 57, instead of the pressure reducing orifice 42, is installed on the steam pipe 41, the valve 43 and the valve opening detecting apparatus 44 become unnecessary.

Figure 11:
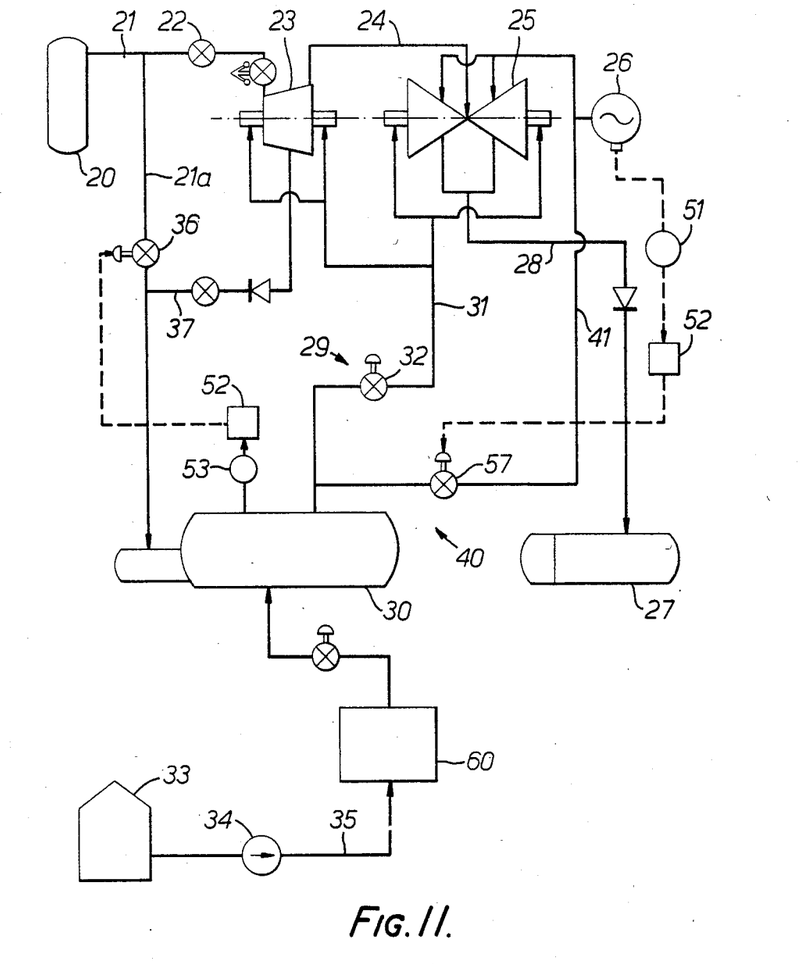

Moreover, as shown in FIG. 11, the valve opening control of the steam pressure reducing valve 57 installed on the steam supply pipe 41 may also be performed in accordance with the detecting signal from the electric generator output detector 51. In this case the main steam from the nuclear reactor 20 or the turbine extraction steam from the high pressure turbine 23 is utilized as the steam within the evaporator 20 so as to heat the condensate. The pressure of the generated steam therein is detected by the pressure detector 53, thereby causing the main steam control valve control apparatus 52 to operate so that the main steam control (pressure reducing) valve 36 is controlled to maintain its opening nearly constant.

Figure 12:
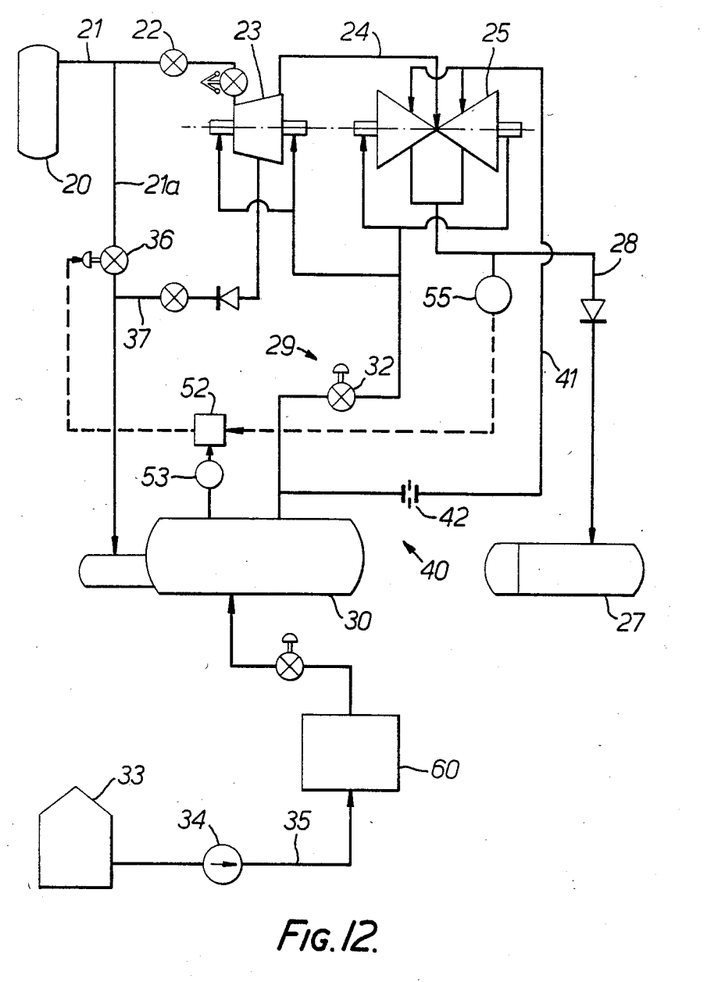

Further, the operation control of the main steam pressure reducing valve control apparatus 52 may also be achieved in the same manner as shown in FIG. 4 even when the main steam pressure reducing valve control apparatus 52 is caused to operate by the detecting signal from the turbine extraction steam pressure detector 55 installed on the turbine extraction steam pipe 28 as shown in FIG. 12.

Although the descriptions of the respective embodiments according to the present invention have been made as to when the steam turbine plant is adapted for the BWR type nuclear power plant, it may also be adapted for a geothermal power plant as well wherein steam with more impurities, such as geothermal steam, is used.

As described above, in a steam turbine plant according to the present invention, there is provided a steam supply apparatus that supplies steam generated within an evaporator of a gland seal steam supply apparatus into the portions of the steam turbine which are in danger of developing stress corrosion cracks. The steam supply apparatus positively supplies clean steam with reduced impurities from the evaporator into the wheel disc portions of the shrink-fit type turbine rotor, which are in danger of developing stress corrosion cracking, so that the portions which are in danger of developing such stress corrosion cracking can always be situtated in an environment that impedes development of stress corrosion cracking. The development of stress corrosion cracking can thus be effectively nipped in the bud, so that the reliability of the shrink-fit type turbine rotor is significantly enhanced and the life span thereof can be lengthened.

Moreover, since the evaporator of the steam supply apparatus is so designed as to use the evaporator of the turbine gland seal steam supply apparatus, this eliminates the need to independently install a new steam generator apparatus on the portions which are in danger of developing stress corrosion cracking, and so an extremely economical steam turbine can be obtained.

Further, in the case where the wet steam from the evaporator is reduced in pressure by means of the pressure reducing apparatus so as to be converted into dry steam and, in turn, supplied into the portions which are in danger of developing stress corrosion cracks, such an environment that impedes development of stress corrosion cracks is better established, so that the reliability as well as the life span of the shrink-fit type turbine rotor can be enhanced.

Still further, according to the present invention, either the steam detecting apparatus or the control apparatus controls, in accordance with the operation load of the steam turbine, the pressure of the steam to be supplied into the portions which are in danger of developing stress corrosion cracking, so that the portions are better maintained in an environment that impedes development of stress corrosion cracking. Moreover, in the case where the pressure reducing valve control apparatus controls the main steam pressure reducing valve so as to control the main steam quantity to be fed into the evaporator, the portions which are in danger of developing stress corrosion cracks are maintained in an environment that impedes development of stress corrosion cracks in a wide range of situations including not only that during the operation of the steam turbine but also prior to the start-up thereof.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A steam turbine plant comprising:
a heat source,
a steam turbine having portions in danger of developing stress corrosion cracking, said steam turbine being provided with a shrink-fit type turbine rotor and a gland seal means,
a first gland seal steam supply apparatus connected to gland seal means for supplying gland seal steam into said gland seal means of said steam turbine, an evaporator incorporated in said gland seal steam supply apparatus, said evaporator being adapted for using a part of a main steam and a turbine extraction steam as a heat medium, and a second steam supply apparatus connected between said evaporator and said turbine for supplying steam generated within said evaporator into said portions of said steam turbine in danger of developing stress corrosion cracking.

2. The steam turbine plant as recited in claim 1, wherein said second steam supply apparatus is provided with a steam supply pipe connected between said evaporator and said steam turbine, said steam supply pipe including a pressure reducing apparatus for reducing in pressure wet steam generated within said evaporator so as to convert said wet steam into dry steam.

3. A steam turbine plant as recited in claim 2, wherein said pressure reducing apparatus includes one of a pressure reducing orifice and a steam pressure reducing valve.

4. A steam turbine plant as recited in claim 3, wherein said second steam supply apparatus comprises a steam detecting apparatus in said steam supply pipe at a position downstream of said pressure reducing apparatus, said steam detecting apparatus being adapted to emit a steam detecting signal when a start-up condition of said steam turbine is achieved.

5. A steam turbine plant as recited in claim 1, wherein said portions being in danger of developing stress corrosion cracking comprise wheel disc portions of a shrink-fit type turbine rotor of a low pressure turbine.

6. A steam turbine plant as recited in claim 1, wherein said evaporator is connected to a condensate storage tank for receiving clean condensate from said condensate storage tank, said evaporator also being connected to said heat source and said steam turbine for respectively receiving main steam and turbine extraction steam as a heat steam medium, thereby heating condensate in said evaporator so as to evaporate the same.

7. A steam turbine plant having a heat source, a steam turbine provided with a shrink-fit type turbine rotor, and a first gland seal steam supply apparatus connected to said turbine for supplying gland seal steam to a gland portion of said steam turbine, said gland seal steam supply apparatus being provided with an evaporator for using a part of a main steam and a turbine extraction steam from said heat source and said turbine, respectively, as a heat medium, said plant comprising:

second steam supply means connected between said evaporator and said turbine for supplying steam generated within said evaporator into portions of said turbine which are in danger of developing stress corrosion cracking, said second steam supply means including a pressure redecing apparatus;

steam detecting means associated with said turbine for detecting steam conditions at said shrink-fit type turbine rotor portion as a function of a turbine load, and control means for receiving a detecting signal from said steam detecting means and connected to said second steam supply means so as to control one of a steam pressure generated within said evaporator and an operation of said pressure reducing apparatus.

8. A steam turbine plant as recited in claim 7 including a turbine extraction steam pipe connected to said turbine, wherein said turbine includes an electric generator, and wherein said steam detecting means include one of an electric generator output detecting apparatus installed on said turbine electric generator and a turbine extraction steam pressure detecting apparatus installed in said turbine extraction steam pipe.

9. A steam turbine plant as recited in claim 7 including a main steam line connected between said heat source and said evaporator, wherein said control means include a pressure reducing valve control apparatus for controlling a main steam pressure reducing valve in said main steam line so as to control a main steam quantity to be supplied into said evaporator.

10. A steam turbine plant as recited in claim 9 including a generated steam pressure detector installed on said evaporator, wherein said pressure reducing valve control apparatus receives detecting signals from said generated steam pressure detector.

11. A steam turbine plant as recited in claim 7, wherein said control means include a steam supply control apparatus connected to said pressure reducing apparatus for controlling operations of said pressure reducing apparatus.

12. A steam turbine plant as recited in claim 7, wherein said pressure reducing apparatus is a steam pressure reducing valve installed on a steam supply pipe connected between said evaporator and said steam turbine.

* * * * *